July 25, 1950 J. M. HADDEN 2,516,769
PEANUT HARVESTER
Filed Dec. 17, 1946 3 Sheets-Sheet 1
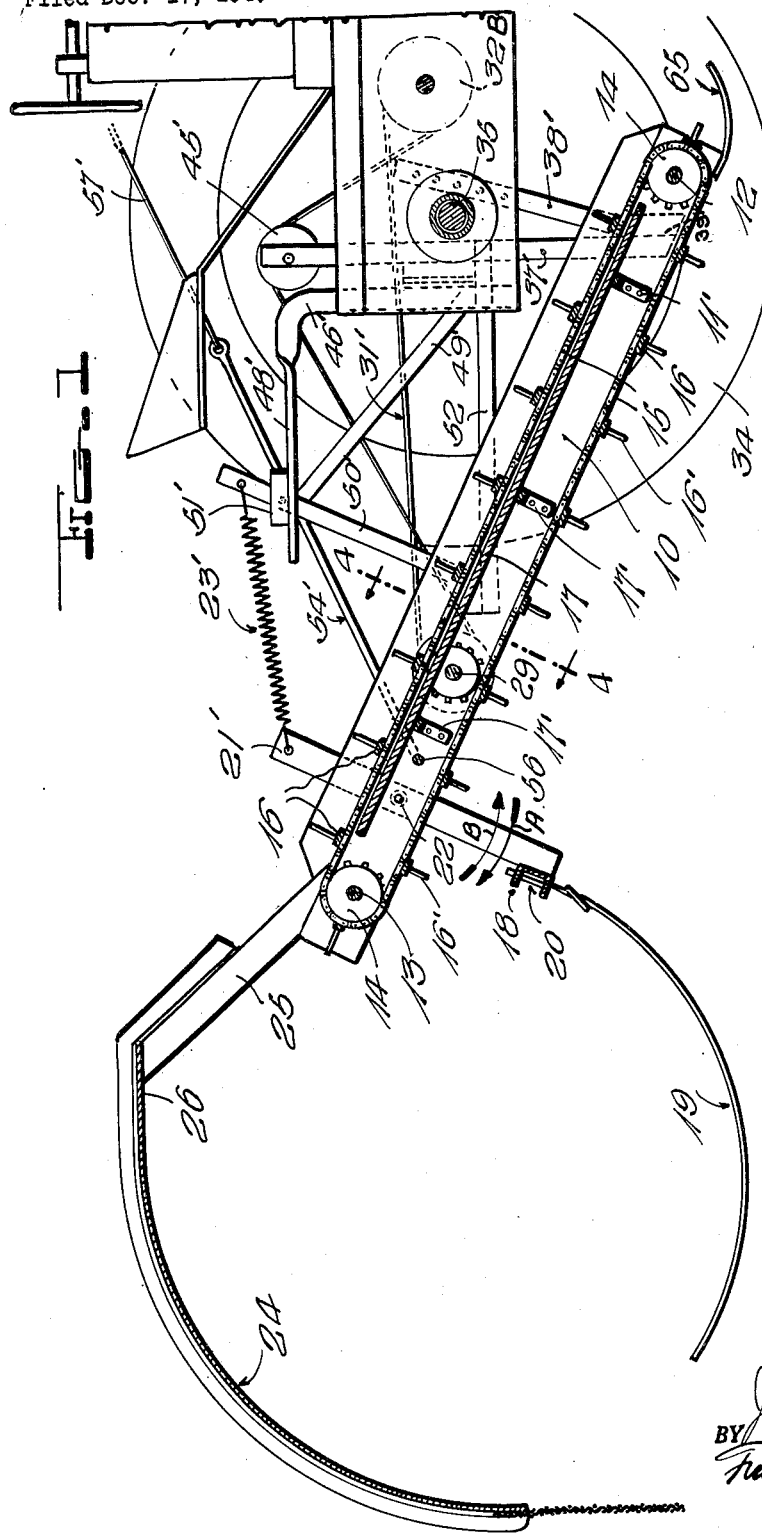
INVENTOR,
Joseph M. Hadden,
BY Frank S. Appleman,
ATTORNEY.

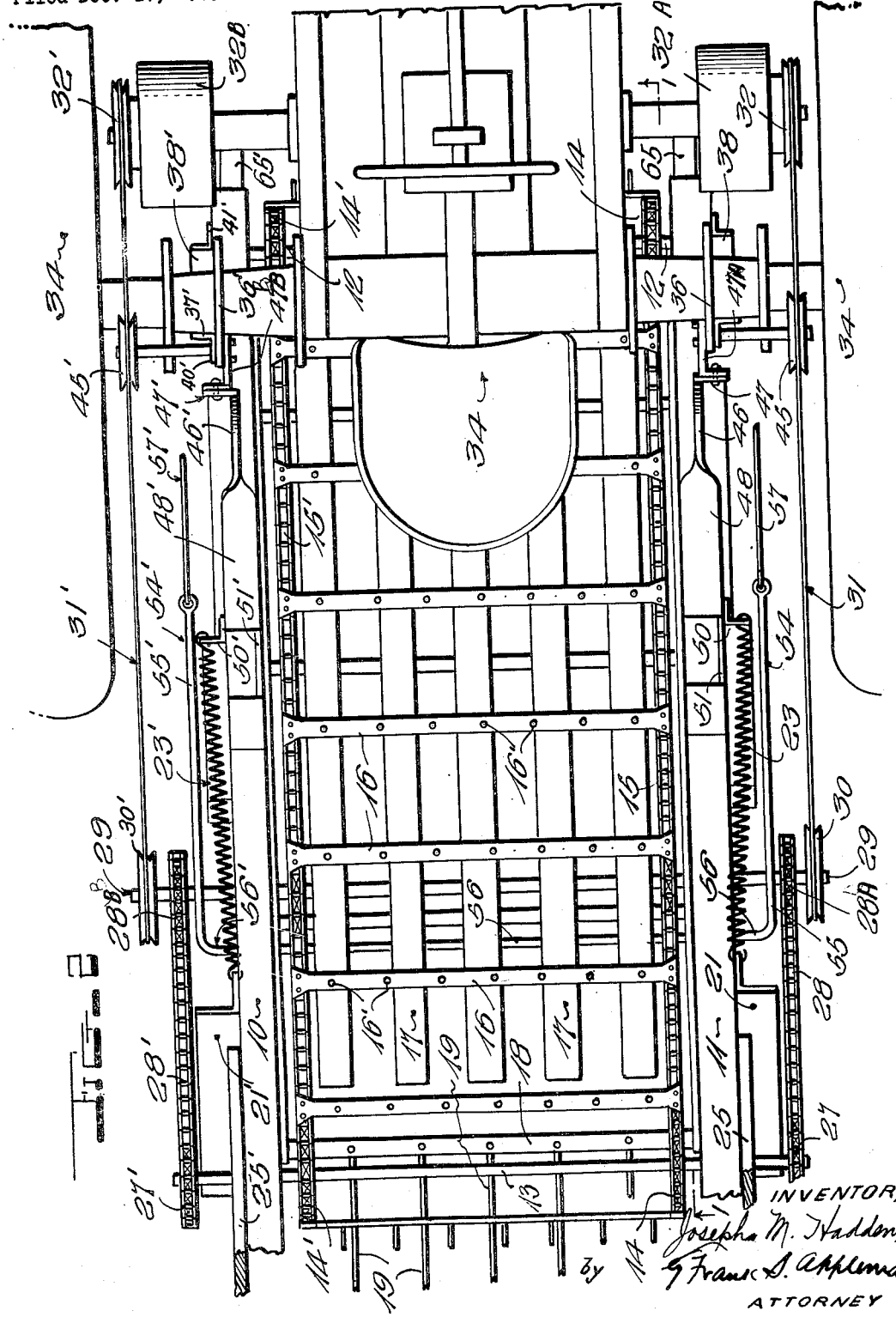

July 25, 1950 J. M. HADDEN 2,516,769
PEANUT HARVESTER
Filed Dec. 17, 1946 3 Sheets-Sheet 3
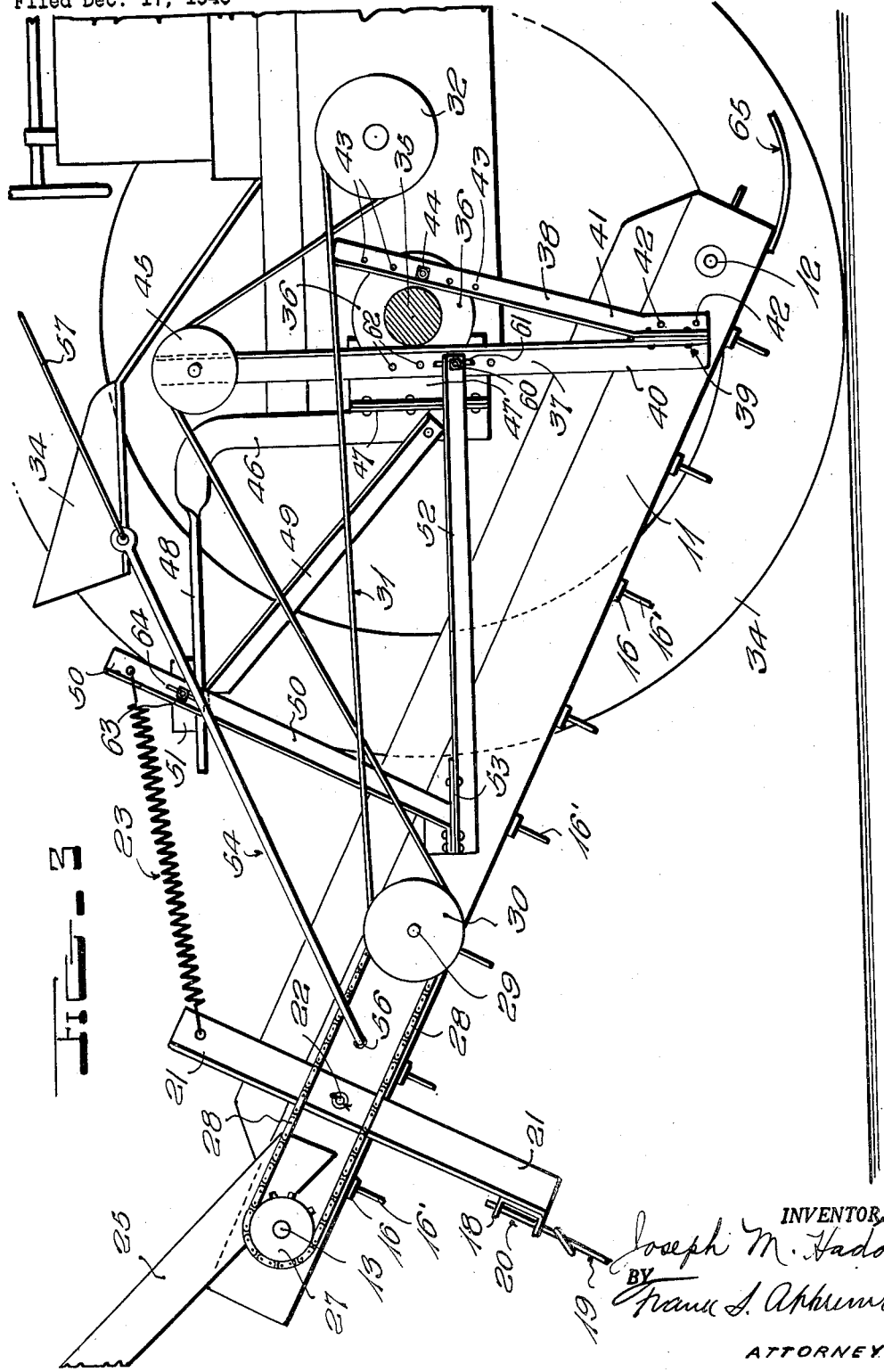
INVENTOR
Joseph M. Hadden,
BY Frank S. Ankerman,
ATTORNEY.

UNITED STATES PATENT OFFICE 2,516,769

PEANUT HARVESTER

Joseph Marshall Hadden, Avera, Ga.

Application December 17, 1946, Serial No. 716,766

3 Claims. (Cl. 56—27)

This invention relates to peanut harvesters, and an object of the invention is to provide means for collecting peanut vines with the peanuts on the roots thereof, and conveying them to a pile-receiving element which is a part of the machine, and dislodging the soil or earth from the roots during the travel of the vines to the piling instrumentality.

A further object of the invention is to provide a peanut collecting and conveying instrumentality having a conveyor associated with a frame structure, having novel means by which the conveyor is actuated or driven from the side front power take-off or by a chain from the conventional rear power take-off of a tractor employed for transporting the collecting means, and in which preferably the tractor is provided with a plow which dislodges the roots of the vines and prepares them for reception by the conveyor, which conveyor has means for engaging the vines and removing them from the earth after they have become dislodged by the plow. While reference has been made to the manner of operating the conveyor, it is obvious that other driving means such as a conventional motor could be utilized for operating the said conveyor.

A still further object of this invention is to provide a receptacle, which term is used synonymously with a "collector," for the vines, on which the vines are piled until their weight overcomes the tension of springs, which springs hold the collector in elevated position until the gravity of the collected vines overcomes the tension of the springs, at which time the collector sags or moves downwardly until the vines on the collector engage the earth and are dragged from the collector by friction of the vines in contact with the earth.

A further object of this invention is to provide a shoe in front of the conveyor which is effective to undercut the loose vines so that they will be presented into operative relation with the conveyor; and it is furthermore an object to provide means for adjusting the depth of operation of the shoe and for holding it at different positions of adjustment.

A further object of this invention is to provide a peanut collector and conveyor which, as stated, has a conveyor driven from a tractor, novel means being provided by which several parts of the conveying apparatus are actuated or driven from the tractor-actuated part, to which reference has been made; and it is furthermore an object to provide a device of this character which is comparatively inexpensive, and the said harvester has proven efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a sectional view taken along the line 1—1 of Figure 2, the view looking in the direction of the arrows;

Figure 2 illustrates a plan view of the peanut harvester but being on a somewhat enlarged scale; and Figure 3 illustrates a view in elevation of the machine, partly in section but being on a somewhat enlarged scale.

Figure 4 illustrates a sectional view on the line 4—4 of Fig. 1 but being on a somewhat enlarged scale.

In these drawings 10 and 11 denote the two side members of the frame, and shafts 12 and 13 are journaled in the said sides at the front and rear end, respectively. The shafts have sprocket wheels, such as 14—14, mounted on them at the inner surfaces of the side members, and sprocket chains 15—15' operate over the said sprocket wheels. Cross members 16, such as rods or bars, have their ends connected to the opposed sprocket chains, the cross members 16 having spurs or spikes 16' that engage the vines or plants and insure their being transferred or moved by the conveyor.

The conveyor is supported in the frame during its travel by longitudinally disposed strips 17 supported by cross members 17' whose ends are secured on the inner surfaces of the side members 10 and 11 of the frame.

In the present embodiment of the invention, the carrier comprises a head member or bar 18 having spaced fingers 19 with their inner ends attached to the bar, as shown at 20, and these fingers extend outwardly in cradle-like formation and the vines are deposited thereon when they reach the end of the conveyor. Arms 21—21' have their lower ends connected to the bar of the cradle, and between their ends each is mounted on a pivot 22, and the upper end of the arms 21—21' are connected to springs 23—23' which have their opposite ends anchored to the frame structure, and the relation of parts is such that the springs exert tension to hold the cradle in its receptive operative position as indicated by the arrow A in Figure 1 until gravity of the pile of vines deposited thereon overcomes the tension of the springs, and the cradle sags or descends as shown by the arrow B until it drags on the ground and the friction occasioned by the engagement of the vines with the ground is operative to dislodge the pile from the cradle, after which the tension of the springs restores the cradle to its receptive position.

In order to dislodge soil from the roots of the vines, a hood 24 has its end attached to the side members, and the said hood may comprise arms 25—25' of angle iron, having their inner ends attached to the side members, and the said arms extend rearwardly and are of concave formation on their lower surfaces. The arms carry a metal plate 26 which forms a hood overlying the pile collector, and as the vines are impelled against the under surface of the hood and the depending end thereof, the impact is sufficient to dislodge soil or earth from the roots of the vines and they are delivered to the collector practically free of adhering earth, although, of course, some disintegrated earth may sift onto the previously collected vines which will be dislodged as the vines are handled for stacking or poling, a process which is usually followed after the vines have been collected.

As a means for operating the conveyor, sprocket wheels 27—27' are applied to the outer ends of the shaft 13, and the sprocket wheels are engaged by sprocket chains 28—28' driving sprocket wheels 28A and 28B on a shaft 29, and pulleys 30—30', preferably of the V type, are also mounted on the said shaft 29, and are respectively engaged by belts 31—31' running over pulleys 32—32'. Each belt derives its power from a tractor to which the harvester is connected and by which it is carried or propelled in its operation; it being the purpose of the inventor that the harvester shall be associated with a tractor 34 having a plow which will be operative to dislodge the peanut vines and make them ready for reception by the shoe of the conveyor. As tractors having plows are of general use, it is thought unnecessary for an understanding of the invention by one skilled in the art to show a plow attached to a tractor as it will be located in advance of the shoes on the inner end of the conveyor.

The sides of the conveyor have equipment for supporting the conveyor, which equipment is duplicated on each side of the harvester, including the means for driving the conveyor from the tractor.

The driven shaft 35 of the tractor is mounted in a bearing which is provided with flanges 36—36', to which are connected the standards 37—37' and braces 38—38', the lower ends of which are joined together, as at 39—39', and these members are preferably of angle iron. The flanges 40—40' and 41—41' are respectively connected to one of the side members of the conveyor by suitable fastenings 42, such as bolts, rivets or the like. The flanges 40—40' and 41—41' each has a series of apertures, such as 43, and they are intended to receive bolts 44 or the like, which adjustably fasten them to the flanges 36—36', so that by this means the inner end of the conveyor may be raised or lowered to suit particular requirements. Guide pulleys 45—45' are rotatably mounted on the upper end of the standards 37—37', and the belts 31—31' respectively are threaded thereover, and the belts may be crossed so that the direction of drive will be such as to operate the conveyor in the correct direction.

The conveyor is further supported at each side by standards 46—46' each having a flange 47—47' bolted or otherwise attached to a plate 47A—47B secured to the flanges 36—36' of the bearing. The standards 46—46' have arms 48—48' extending approximately horizontally, and braces 49—49' extend diagonally between the standards and the arms and are connected thereto for strengthening the structure. Braces 50 and 50' are anchored to plates 51—51' on the arms 48—48' and the springs 23—23' are connected to the upper ends of the respective braces. The lower end of the braces 50—50' are connected to beams 52 having one end attached to the posts 37—37', as shown, and the other end attached to one side of the conveyor frame. The nesting of the braces 50—50', beams 52—52' in relation to the side members of the frame is shown at 53—53', and it is believed that the parts are so obviously illustrated that detail description thereof is unnecessary, since appropriate joints between these parts may be modified to suit particular requirements.

It is obvious, however, that by reason of the adjustment between the posts 37—37' and between the arms 48—48' and the braces 50—50' that provision is made for adjusting the height of the conveyor with relation to the tractor and the ground.

As a further means for supporting the outer end of the conveyor, a U-shaped member 54—54' have arms, such as 55—55', and that portion of the member between the arms extends through the side of the conveyor, as shown at 56—56'. The arms extend forwardly and have suitable cables, ropes, or connections, such as 57—57', the inner ends of which are anchored to the tractor.

The standard 37 and beam 52 are secured together by fastenings 60, such as a nut, which operates in slots 61 for permitting the adjustment of the height of the outer end of the conveyor, whereas the said standard has holes 62 by which the positioning of the standards 37—37' may be adjusted with relation to the tractor shaft and, as a further means for affording an adjustment of the frame, the braces 50—50' have bolts 63 in slots 64 of the said braces so that the adjustment of the conveyor may be accomplished.

In describing the pulleys 32, a description of the details of the manner in which they are to be operated is omitted, but it may be stated that they are connected to the usual take-off pulleys 32A and 32B of a tractor or such conventional means installed as a part of the tractor. Furthermore, with relation to the means for directing the vines to the conveyor, a suitable shoe 65 may be attached to the inner end of each of the side members 10 and 11 which will lift vines so that the spurs 16' of the conveyor may encounter the said vines and carry them from the shoe. The shoe may be of any conventional type and the inventor does not wish to be limited with respect to its construction.

I claim:

1. A collector for peanut vines for use with a peanut harvester having a power driven conveyor adapted to pick up the vines comprising a vine collecting member, spaced arms pivotally mounted on the rear end of the conveyor, means for connecting said vine collecting member to the lower end of said arms, a pair of spaced fixed supports on said conveyor forwardly of the spaced arms, and spring means attached to the upper end of each of said arms and to each of said fixed supports on the conveyor whereby the vine collecting member is yieldingly supported above the ground until the weight of the load thereon overcomes the action of said spring means whereupon the arms will move downwardly about their pivots and the vine collecting member will engage the ground for frictionally removing the load therefrom.

2. In a vine collector as claimed in claim 1 in which a hood is rigidly supported by the conveyor intermediate the spaced arms and the end of the conveyor and projects beyond the conveyor, said hood including an arcuate-like member partially encircling the vine collecting member so that the vines leaving the conveyor will be directed thereagainst to dislodge foreign matter from the vines.

3. A collector for peanut vines for use with a peanut harvester having a power conveyor of the type adapted to pick up the vines comprising spaced arms pivotally mounted on the rear end of the conveyor, a horizontally disposed support secured to the lower ends of said arms, a plurality of outwardly extending arcuate fingers attached at their free ends to the support, a pair of spaced fixed supports associated with said conveyor and extending upwardly therefrom, a pair of spaced arms rigidly supported at the rear of and projecting beyond the conveyor, an arcuate hood supported by said arms and partially encircling the said outwardly extending arcuate fingers whereby the vines leaving the conveyor will be directed thereagainst to dislodge foreign matter from the vines and spring means connected to the upper end of each pivotally mounted arm and to each fixed support whereby said outwardly extending fingers are yieldingly supported above the ground until the weight of the load deposited thereon overcomes the action of the springs whereupon the outwardly extending fingers will move downwardly and engage the ground for frictionally removing the load therefrom.

JOSEPH MARSHALL HADDEN.

REFERENCES CITED

The following references are of record in the file of this patent:

UNITED STATES PATENTS

| Number | Name | Date |
|---|---|---|
| 948,006 | Cocking | Feb. 1, 1910 |
| 1,212,094 | Myers | Jan. 9, 1917 |
| 2,385,829 | Melroe | Oct. 2, 1945 |
| 2,389,567 | Thornton | Nov. 20, 1945 |